UNITED STATES PATENT OFFICE 2,665,985

LIGHT-SENSITIVE DIAZO COMPOUNDS AND PHOTOPRINT MATERIAL PREPARED THEREFROM

Oskar Süs, Wiesbaden-Biebrich, Germany, assignor to Keuffel & Esser Company, Hoboken, N. J.

No Drawing. Application October 20, 1950, Serial No. 191,325

Claims priority, application Germany October 26, 1949

15 Claims. (Cl. 95—6)

The present invention relates to new light-sensitive diazo compounds suitable for diazoprinting. More particularly it relates to diazo compounds prepared from 5 - (4' - amino - 2',5'-dialkyloxy - phenyl) - 2 - amino - 4 - imino - triazines and diazotype material using these diazo compounds as the light sensitive component.

Two types of light sensitive diazo-type materials have been used in the art. These are one-component materials and two-component materials. In both types of materials, the diazo compound which is not destroyed by the action of light is coupled with a compound to form an azo dye image. This compound which couples with the diazo compound is known in the art as the azo component. In one-component materials, the azo component is not applied to the material until after exposure when it couples with the undecomposed diazo compound. In the case of two-component materials, however, both the diazo compound and the azo component are coated on the base material. The coated material is then exposed to light and developed by exposing it to a moist vaporous or gaseous alkaline medium in the presence of which the azo component couples with the undecomposed diazo compound in the areas not struck by light to form the image.

Mono-diazo compounds of para-diamino-benzenes having a secondary or tertiary nitrogen atom are suitable for the preparation of light sensitive materials. Diazo compounds of this class substituted by alkyl groups linked to nitrogen can be used with good results for the preparation of two-component papers because of their low coupling capacity. Amino-diazo benzenes acylated at nitrogen, especially those of the type represented by the following formula:

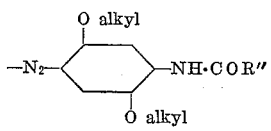

in which R" stands for aryl or aralkyl may be advantageously used for the preparation of one-component papers. These latter diazo compounds have the desirable property of yielding dyestuffs of high fastness to light with the azo components customarily used in the diazo type process. On account of their high coupling capacity, however, these diazo compounds are not suitable for the preparation of the type of papers which is preferred in practice, namely two-component papers which must be coated with compounds not inclined to premature coupling.

Now it has been found that light-sensitive materials the light-sensitivity of which is due to the presence of diazo compounds of amino-phenyltriazines having the general formula:

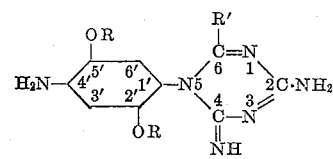

in which R represents alkyl or aralkyl and R' represents hydrogen, alkyl, aryl or aralkyl, can be used to make excellent prints.

Diazo compounds of the triazine series which are used as light-sensitive substances according to this invention have a position with regard to coupling capacity intermediate between N-alkyl-amino diazo benzenes of poor coupling capacity and N-acyl-amino diazo compounds of high coupling capacity. For this reason the diazo compounds of the triazine series are suitable for the preparation of two-component materials as well as for one-component materials. Good results are obtained in either case. The usefulness of these compounds is further enhanced, because they yield in combination with the azo components ordinarily used in the diazotype process, dyestuffs which are especially advantageous because of their high fastness to light and their deep, often dark-blue shades. The dyestuffs formed from these diazo compounds excel the already known dyestuffs in this respect.

The methods for the application of the light-sensitive coating to the base material in producing either the one-component material and the two-component material are known in the art. These known methods may be used with the new diazo compounds of the present invention. The new light-sensitive materials coated with the new light sensitive diazo compounds are handled by the customary methods in use.

The diazo compounds used for the preparation of light-sensitive materials for the diazo type process according to the present invention have not been disclosed until now. They can be prepared by boiling dialkoxyphenylbiguanides with organic acids to form triazines, and nitrifying the latter in glacial acetic acid. The course of the reaction is illustrated by the following scheme:

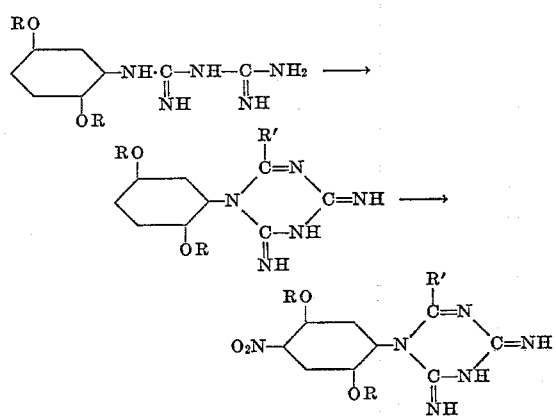

The reaction product also may assume the tautomeric form:

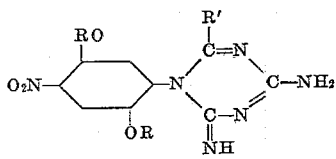

The diazo compounds are prepared in the usual manner from the bases formed after reduction of the nitro compounds. Because these compounds may be readily prepared and because of the excellent fastness to light and coloring power of the dyestuffs prepared therewith, these new diazo compounds besides being primarily useful for the diazotype process, represent valuable intermediate products for use in the manufacture of dyestuffs.

The salts and double salts of the new diazo compounds are preferably used in the coating of light sensitive diazotype materials. For example the double salts of zinc chloride or tin chloride may be used. These salts are readily soluble in water. Most of them are pale yellow and their solutions are yellow to orange.

The following examples are inserted in order to illustrate the present invention. It is not intended to limit the scope of the invention to the subject matter described in the examples.

(1) 1.2 g. of the diazo compound derived from 4'-amino-2', 5'-diethoxy - 5 - phenyl-2-amino-4-imino-6-methyltriazine (hydrochloride) are added to a solution consisting of 2.0 g. of citric acid,
1.5 g. of boric acid,
2.5 g. of thiourea,
1.5 g. of aluminum sulfate,
2.0 g. of 1,3,6-naphthalene-trisulfonic acid sodium salt,
0.75 g. of biguanide derived from 1-amino-7-hydroxy-naphthalene,
50 cc. of water.

Paper is coated with this solution in the usual manner. When copies are prepared from this light-sensitive paper by exposure under a suitable pattern, a deep-blue image on a white background is obtained after development with ammonia.

The diazo compound used in this example is prepared as follows:

1-amino-2,5-diethoxybenzene-hydrochloride is reacted with dicyandiamide in the usual manner to give 1 - biguanido - 2,5 - diethoxybenzene. The biguanido compound is transformed by boiling with glacial acetic acid anhydride into 2',5' - diethoxy - 5 - phenyl-2-amino-4-imino-6-methyltriazine. The triazine is nitrated with nitric acid ($d=1.400$) right in the glacial acetic acid solution.

The crystallized nitro compound melts at 253° C. The base obtained by reaction of the nitro compound with hydrogen in the presence of colloidal nickel melts at 165° C. It is transformed into the diazo compound in the usual manner.

(2) 1.2 g. of the diazo compound made from 4'-amino-2', 5'-dimethoxy-5-phenyl-2-amino-4-imino-6-methyltriazine (hydrochloride) are added to a solution consisting of 2.0 g. of citric acid,
1.5 g. of boric acid,
2.5 g. of thiourea,
1.5 g. of aluminium sulfate,
2.0 g. of 1,3,6-naphthalene-trisulfonic acid sodium salt,
0.75 g. of hydrochloride of the ethylenediamide of 2,3-hydroxy-naphthoic acid (compare U. S. Patent 2,233,038), and
50 cc. of water.

Prints with dark blue-violet lines of excellent light stability can be obtained from paper coated with this solution.

The diazo compound of this example is prepared in an analogous manner to the method used in the preparation of the diazo compound of Example 1. The hydrochloride of the 4'-amino - 2',5' - dimethoxy - 5 - phenyl-2-amino-4-imino-6-methyltriazine melts at 265° C. with decomposition.

(3) 1.4 g. of the tin chloride double salt of the diazo compound derived from 4'-amino-2',5'-diethoxy-5-phenyl-2-amino-4-imino-triazine are added to a solution consisting of 0.5 g. of citric acid,
0.5 g. of boric acid,
0.5 g. of aluminium sulfate,
1.0 g. of 1,3,6-naphthalene-trisulfonic acid sodium salt,
2.5 g. of thiourea, and
50 cc. of water.

Paper is coated with this solution in the usual manner. The light-sensitive paper is exposed to light under a pattern. The images obtained are developed with a solution containing 13 g. of the following ingredients in 100 cc. of water.

25.0 g. of sodium acetate (water-free),
5.0 g. of borax,
12.5 g. of sodium bicarbonate, and
1.0 g. of phloroglucinol.

Prints with black-brown lines are obtained.

The diazo compound of this example is prepared from 1-biguanido - 2,5 - diethoxy-benzene which is transformed to 2',5'-diethoxy-5-phenyl-2-amino-4-imino-triazine by boiling the biguanidobenzene for 6 hours with about ten times as much formic acid. The crude product obtained after evaporation of the formic acid is nitrated in glacial acetic acid in the usual manner. The nitro compound recrystallized from alcohol melts at 213° C. The diazo compound is prepared in the usual manner from the base obtained by reduction of the nitro compound with hydrogen in alcoholic solution in the presence of finely dispersed nickel. (The hydrochloride of the base decomposes at 266° C.)

(4) 1.2 g. of the diazo compound derived from 4'-amino-2',5'-diethoxy-5-phenyl - 2 - amino-4- imino-6-phenyl-triazine (hydrochloride) are added to a solution consisting of 2.0 g. of citric acid,
1.5 g. of boric acid,
2.5 g. of thiourea,
1.5 g. of aluminium sulfate,
2.0 g. of 1,3,6-naphthalene-trisulfonic acid sodium salt,
0.75 g. of hydrochloride of the ethylene diamide of 2,3-hydroxy-naphthoic acid (compare U. S. Patent No. 2,223,038), and
50 cc. of water at 40° C.

Paper is coated with this solution in the same manner as in the previous examples. Copies which are prepared with the aid of this paper yield pure blue lines after dry development with ammonia.

The above mentioned diazo compound is prepared as follows:

30 g. of 1-biguanido-2,5-diethoxy benzene are heated together with 44 g. of benzoic acid anhydride to 140° C. for 2 hours. The melt is treated with a 10% sodium hydroxide solution. 4'-amino-2',5'-diethoxy-5-phenyl-2-amino-4-imino-6-phenyl-triazine remains as an oil which soon solidifies. After recrystallizing from alcohol this compound has a melting point of 148° C. The nitration product prepared in the same manner as in the previous examples melts at 183° C. The base obtained after reduction crystallizes in greenish-yellow needles. It has a melting point of 115° C.

(5) Paper is coated on one side with a solution containing 1.3 g. of the diazo compound derived from 4'-amino-2',5'-diethoxy-5-phenyl-2-amino-4-imino-6-ethyl-triazine (hydrochloride),
0.5 g. of citric acid,
0.5 g. of boric acid,
0.5 g. of aluminium sulfate,
1.0 g. of 1,3,6-naphthalene-trisulfonic acid sodium salt, and
2.5 g. of thiourea in 50 cc. of water.

After paper coated with this solution is exposed to light under a master and developed with a mixture containing a coupling azo component, copies with black-brown lines of good fastness to light are obtained.

The above mentioned diazo compound can be prepared as follows:

15 g. of the biguanide derived from 1-amino-2,5-diethoxy benzene and 20 g. of propionic acid anhydride are heated together at 140° C. for 2 hours. The melt is treated with about 100 cc. of a warmed 10% solution of sodium hydroxide. On cooling 2',5'-diethoxy-5-phenyl-2-amino-4-imino-6-ethyl triazine crystallizes out of the solution. After recrystallizing from alcohol the triazine melts at 138° C. The nitration product prepared in the usual manner melts at 169° C., and the amino compound (free base) obtained by reduction of the nitro compound melts at 148° C.

After having fully disclosed and described my present invention, what I claim is:

1. The light-sensitive diazonium salts of the amino compounds having the general formula

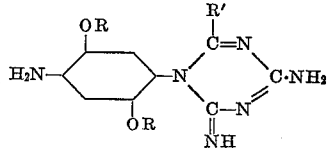

in which the amino group attached to the benzene ring is diazotized, R stands for a member selected from the group consisting of alkyl radicals of 1-4 carbon atoms and aralkyl radicals and R' stands for a member selected from the group consisting of hydrogen, alkyl, aralkyl, and aryl radicals.

2. The light-sensitive diazonium salts of the amino compounds having the general formula

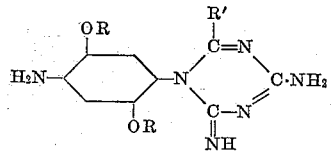

in which the amino group attached to the benzene ring is diazotized, R represents an alkyl group of 1-4 carbon atoms and R' stands for a member selected from the group consisting of hydrogen and alkyl radicals.

3. The light-sensitive diazonium salts of the amino compound of the formula

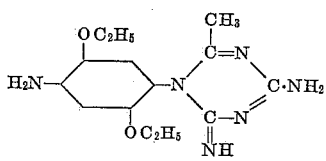

in which the amino group attached to the benzene ring is diazotized.

4. The light-sensitive diazonium salts of the amino compound of the formula

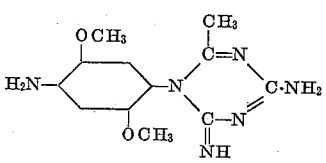

in which the amino group attached to the benzene ring is diazotized.

5. The light-sensitive diazonium salts of the amino compound of the formula

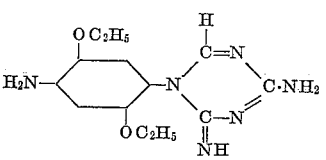

in which the amino group attached to the benzene ring is diazotized.

6. The light-sensitive diazonium salts of the amino compound of the formula

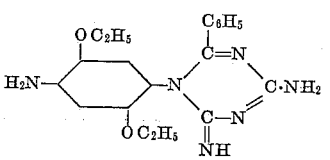

in which the amino group attached to the benzene ring is diazotized.

7. The light-sensitive diazonium salts of the amino compound of the formula

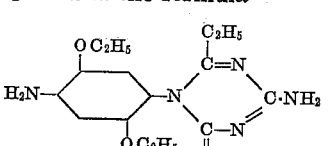

in which the amino group attached to the benzene ring is diazotized.

8. Photoprinting material comprising a light sensitive diazonium salt of an amino compound of the general formula

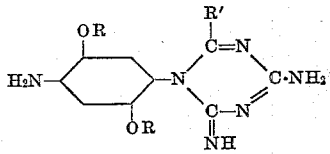

in which the amino group attached to the benzene ring is diazotized, R stands for a member selected from the group consisting of alkyl radicals of 1-4 carbon atoms and aralkyl radicals and R' stands for a member selected from the group consisting of hydrogen, alkyl, aralkyl, and aryl radicals carried on a base sheet material.

9. Photoprinting material comprising a light sensitive diazonium salt of an amino compound of the general formula

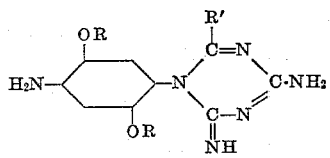

in which the amino group attached to the benzene ring is diazotized, R represents an alkyl group of 1-4 carbon atoms and R' stands for a member selected from the group consisting of hydrogen and alkyl radicals carried on a base sheet material.

10. Photoprinting material comprising a light sensitive diazonium salt of the amino compound of the formula

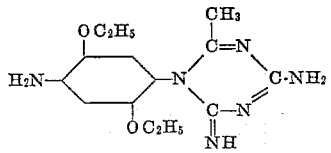

in which the amino group attached to the benzene ring is diazotized, carried on a base sheet material.

11. Photoprinting material comprising a light sensitive diazonium salt of the amino compound of the formula

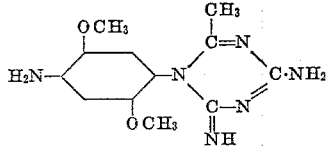

in which the amino group attached to the benzene ring is diazotized, carried on a base sheet material.

12. Photoprinting material comprising a light sensitive diazonium salt of the amino compound of the formula

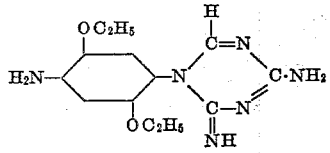

in which the amino group attached to the benzene ring is diazotized, carried on a base sheet material.

13. Photoprinting material comprising a light sensitive diazonium salt of the amino compound of the formula

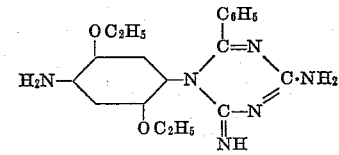

in which the amino group attached to the benzene ring is diazotized, carried on a base sheet material.

14. Photoprinting material comprising a light sensitive diazonium salt of the amino compound of the formula

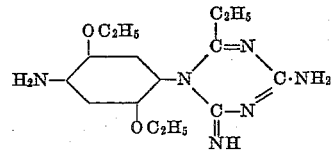

in which the amino group attached to the benzene ring is diazotized, carried on a base sheet material.

15. Photoprinting material comprising an azo component and a light sensitive diazonium salt of an amino compound of the general formula

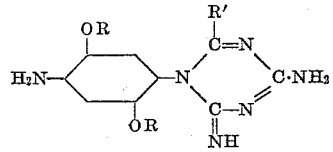

in which the amino group attached to the benzene ring is diazotized, R stands for a member selected from the group consisting of alkyl radicals of 1-4 carbon atoms and aralkyl radicals and R' stands for a member selected from the group consisting of hydrogen, alkyl, aralkyl, and aryl radicals carried on a base sheet material.

OSKAR SÜS.

References Cited in the file of this patent

UNITED STATES PATENTS

| Number | Name | Date |
|---|---|---|
| 2,277,409 | Murray | Mar. 24, 1942 |
| 2,447,440 | Thurston | Aug. 17, 1948 |
| 2,493,703 | Thurston | Jan. 3, 1950 |

FOREIGN PATENTS

| Number | Country | Date |
|---|---|---|
| 709,585 | Germany | Aug. 21, 1941 |